United States Patent
Chodorski (10) Patent No.: US 11,869,352 B2
(45) Date of Patent: Jan. 9, 2024

(54) EMERGENCY ALERT TRANSMISSION SYSTEM AND METHOD

(71) Applicant: James Chodorski, Sugar Grove, IL (US)

(72) Inventor: James Chodorski, Sugar Grove, IL (US)

(*) Notice: Subject to any disclaimer, the term of this patent is extended or adjusted under 35 U.S.C. 154(b) by 0 days.

(21) Appl. No.: 17/168,914

(22) Filed: Feb. 5, 2021

(65) Prior Publication Data
US 2021/0248907 A1    Aug. 12, 2021

Related U.S. Application Data

(60) Provisional application No. 62/975,608, filed on Feb. 12, 2020.

(51) Int. Cl.
| | |
|---|---|
| *G08G 1/0965* | (2006.01) |
| *G08B 5/38* | (2006.01) |
| *G08B 3/10* | (2006.01) |
| *H04W 4/90* | (2018.01) |
| *H04W 4/02* | (2018.01) |
| *H04W 4/40* | (2018.01) |
| *H01Q 1/32* | (2006.01) |
| *H01Q 21/20* | (2006.01) |

(52) U.S. Cl.
CPC ............ *G08G 1/0965* (2013.01); *G08B 3/10* (2013.01); *G08B 5/38* (2013.01); *H01Q 1/3208* (2013.01); *H01Q 21/205* (2013.01); *H04W 4/023* (2013.01); *H04W 4/40* (2018.02); *H04W 4/90* (2018.02)

(58) Field of Classification Search
CPC ....... G08G 1/0965; G08G 1/087; H04W 4/90; H04W 4/40; G08B 3/10; G08B 5/38
See application file for complete search history.

(56) References Cited

U.S. PATENT DOCUMENTS

| | | |
|---|---|---|
| 3,673,560 A | 6/1972 | Barsh et al. |
| 3,760,349 A | 9/1973 | Keister et al. |
| 3,775,743 A | 11/1973 | Carter |
| 3,876,940 A | 4/1975 | Wickord et al. |
| 3,949,300 A | 4/1976 | Sadler |
| 4,238,778 A | 12/1980 | Ohsumi |
| 4,764,978 A | 8/1988 | Argo et al. |
| 5,307,060 A * | 4/1994 | Prevulsky ............ G08G 1/0965 340/901 |
| 5,495,243 A | 2/1996 | McKenna |
| 5,757,284 A | 5/1998 | Trizzino et al. |
| 5,933,093 A * | 8/1999 | Austin, II ............ G08G 1/0965 340/902 |
| 6,087,961 A | 7/2000 | Markow |

(Continued)

*Primary Examiner* — Hoi C Lau
(74) *Attorney, Agent, or Firm* — Foley & Lardner LLP (57) ABSTRACT

A mobile alert transmission system for an emergency vehicle, includes a switch configured to activate an emergency alert. An antenna is configured to emit radio-frequency waves that transmit the emergency alert. A signal generator is electronically coupled to the antenna, and is configured to generate the radio-frequency waves and to provide the radio-frequency waves to the antenna. A controller is communicable with the signal generator and the switch. The controller is configured to receive a command from the switch to activate the emergency alert and to cause the signal generator to generate radio-frequency waves.

20 Claims, 4 Drawing Sheets

(56) References Cited

U.S. PATENT DOCUMENTS

| | | | | |
|---|---|---|---|---|
| 6,160,493 | A * | 12/2000 | Smith | G08G 1/0965 340/902 |
| 6,252,519 | B1 | 6/2001 | McKenna | |
| 6,252,521 | B1 * | 6/2001 | Griffin | G08G 1/0965 340/384.1 |
| 6,362,749 | B1 * | 3/2002 | Brill | G08G 1/0965 174/36 |
| 6,417,782 | B1 | 7/2002 | Darnall | |
| 6,603,395 | B2 * | 8/2003 | Wilson | B60Q 1/50 340/468 |
| 6,614,362 | B2 * | 9/2003 | Siegel | G08G 1/0965 340/902 |
| 6,630,892 | B1 * | 10/2003 | Crockford | B60W 40/04 340/436 |
| 6,804,490 | B2 * | 10/2004 | Cook | G08B 3/10 341/141 |
| 6,859,147 | B2 | 2/2005 | Buscemi | |
| 6,864,784 | B1 * | 3/2005 | Loeb | G08G 1/096716 180/171 |
| 6,958,707 | B1 * | 10/2005 | Siegel | G08G 1/087 340/435 |
| 7,057,528 | B1 | 6/2006 | Ewing et al. | |
| 7,061,402 | B1 * | 6/2006 | Lawson | G08G 1/0965 340/901 |
| 7,090,371 | B1 * | 8/2006 | Bonar | B60Q 1/0491 307/10.8 |
| 7,161,485 | B2 * | 1/2007 | Melman | G08G 1/0965 340/539.18 |
| 7,271,736 | B2 * | 9/2007 | Siegel | G08G 1/087 340/435 |
| 7,397,356 | B1 * | 7/2008 | Johnson | G08G 1/0965 340/435 |
| 8,466,805 | B2 * | 6/2013 | Waymire | G08G 1/0965 340/902 |
| 8,593,301 | B2 * | 11/2013 | Newman | G08G 1/0965 340/902 |
| 8,928,492 | B2 * | 1/2015 | Boscacci | G08G 1/0965 340/902 |
| 9,704,397 | B1 | 7/2017 | Bjorklund | G08G 1/0965 |
| 9,986,401 | B2 * | 5/2018 | El-Dinary | H04W 72/0453 |
| 11,351,988 | B2 * | 6/2022 | Soltanian | G05D 1/0289 |
| 2001/0038344 | A1 * | 11/2001 | Garcia | G08G 1/0965 340/902 |
| 2003/0043056 | A1 * | 3/2003 | Siegel | G08G 1/0965 340/902 |
| 2003/0102985 | A1 * | 6/2003 | Turbeville | G08G 1/0965 340/902 |
| 2003/0137408 | A1 * | 7/2003 | Breiner | B60Q 1/50 340/425.5 |
| 2004/0036627 | A1 * | 2/2004 | Knoski | G08G 1/0965 340/902 |
| 2004/0087317 | A1 * | 5/2004 | Caci | G01S 5/021 455/456.1 |
| 2004/0246144 | A1 * | 12/2004 | Siegel | G08G 1/0965 340/902 |
| 2007/0216539 | A1 * | 9/2007 | D'Antoni | G08G 1/0965 340/902 |
| 2007/0273551 | A1 | 11/2007 | Jacobs et al. | |
| 2008/0074286 | A1 | 3/2008 | Gill et al. | |
| 2008/0106435 | A1 * | 5/2008 | Kirkpatrick | G08G 1/0965 340/902 |
| 2010/0087146 | A1 * | 4/2010 | Han | H04B 5/02 455/41.2 |
| 2012/0086603 | A1 * | 4/2012 | Park | H01Q 1/1257 342/374 |
| 2014/0128146 | A1 * | 5/2014 | Story, Jr. | A63F 13/217 463/36 |
| 2014/0340240 | A1 * | 11/2014 | Becker | G01S 19/48 340/932.2 |
| 2015/0061895 | A1 * | 3/2015 | Ricci | B60K 28/00 340/902 |
| 2015/0371539 | A1 * | 12/2015 | Hawkins, Sr. | G08G 1/096791 340/902 |
| 2016/0098926 | A1 * | 4/2016 | Probert | G08G 1/0965 340/903 |
| 2016/0253903 | A1 * | 9/2016 | Wilk | G08G 1/087 340/902 |
| 2016/0355125 | A1 * | 12/2016 | Herbert | G08G 1/0965 |
| 2017/0013534 | A1 * | 1/2017 | Bellis | H04W 40/06 |
| 2017/0324897 | A1 * | 11/2017 | Swaminathan | H04N 23/64 |
| 2019/0354775 | A1 * | 11/2019 | Leizerovich | G06V 20/52 |
| 2019/0387152 | A1 * | 12/2019 | Sivan | G06F 3/013 |
| 2020/0031337 | A1 * | 1/2020 | Soltanian | G06V 20/58 |
| 2020/0126412 | A1 * | 4/2020 | James | H04B 17/318 |
| 2020/0294397 | A1 * | 9/2020 | Lei | G08G 1/091 |
| 2021/0011472 | A1 * | 1/2021 | Schechter | G05D 1/0206 |
| 2021/0248907 | A1 * | 8/2021 | Chodorski | H01Q 1/3208 |

* cited by examiner

EMERGENCY ALERT TRANSMISSION SYSTEM AND METHOD

CROSS-REFERENCE TO RELATED APPLICATION

This application claims the benefit of and priority to U.S. Provisional Patent Application No. 62/975,608 filed on Feb. 12, 2020, the entire disclosure of which is hereby incorporated by reference herein.

BACKGROUND

The present disclosure relates generally to the field of emergency response systems. More specifically, the present disclosure relates to a secondary emergency alert transmission system that is integrated into an emergency vehicle's primary emergency alert protocol so as to alert other drivers and pedestrians of the presence of an active emergency response vehicle through the use of radio-frequency waves.

SUMMARY

At least one embodiment relates to a mobile alert transmission system for an emergency vehicle. The mobile alert transmission system comprises a switch configured to activate an emergency alert. The mobile alert transmission system further comprises an antenna configured to emit radio-frequency waves configured to transmit the emergency alert. The mobile alert transmission system further comprises a signal generator electronically coupled to the antenna, the signal generator configured to generate the radio-frequency waves and to provide the radio-frequency waves to the antenna. The mobile alert transmission system further comprises a controller communicable with the signal generator and the switch. The controller is configured to receive a command from the switch to activate the emergency alert. The controller is further configured to cause the signal generator to generate radio-frequency waves.

Another embodiment relates to a mobile alert transmission system for an emergency vehicle. The mobile alert transmission system comprises a plurality of light indicators configured to produce a visual alert when an emergency alert is activated. The mobile alert transmission system further comprises a controller electronically coupled to the plurality of light indicators and removably coupled to the plurality of light indicators. The mobile alert transmission system further comprises a circuit switch configured to removably couple the plurality of light indicators to the controller when the circuit switch is activated. The mobile alert transmission system further comprises an antenna configured to emit radio-frequency waves when the emergency alert is activated. The mobile alert transmission system further comprises a signal generator electronically coupled to the antenna and electronically coupled to the controller. The signal generator is configured to generate the radio-frequency waves and to provide the radio-frequency waves to the antenna. The controller is configured to activate the circuit switch when the emergency alert is activated. The controller is further configured to cause the circuit switch to removable couple the plurality of light indicators to the controller. The controller is further configured to cause the signal generator to generate radio-frequency waves.

Yet another embodiment relates to a method of generating and transmitting a mobile alert from an emergency vehicle. The method comprises receiving, by a controller, an indication that an emergency alert has been activated. The method further comprises determining, by the controller, if an electronic switch is activated. The electronic switch configured to activate a radio-frequency alert. The method further comprises causing, by the controller, a signal generator to generate a signal. The signal generator operatively coupled to the electronic switch. The method further comprises transmitting, by the controller, the signal to an antenna operatively coupled to the signal generator. The method further comprises causing, by the controller, the antenna to emit radio-frequency waves.

This summary is illustrative only and is not intended to be in any way limiting.

BRIEF DESCRIPTION OF THE DRAWINGS

The disclosure will become more fully understood from the following detailed description, taken in conjunction with the accompanying figures, wherein like reference numerals refer to like elements unless otherwise indicated.

It will be recognized that the figures are schematic representations for purposes of illustration. The figures are provided for the purpose of illustrating one or more implementations with the explicit understanding that the figures will not be used to limit the scope or the meaning of the claims.

DETAILED DESCRIPTION

Following below are more detailed descriptions of various concepts related to, and implementations of, a secondary emergency alert transmission system that is integrated into an emergency vehicle's primary emergency alert protocol so as to alert other drivers and pedestrians of the presence of an active emergency response vehicle through the use of radio-frequency waves. The various concepts introduced above and discussed in greater detail below may be implemented in any of a number of ways, as the described concepts are not limited to any particular manner of implementation. Examples of specific implementations and applications are provided primarily for illustrative purposes.

Before turning to the figures, which illustrate certain exemplary embodiments in detail, it should be understood that the present disclosure is not limited to the details or methodology set forth in the description or illustrated in the figures. It should also be that the terminology used herein is for the purpose of the description only and should not be regarded as limiting.

Generally speaking, emergency vehicles caution other vehicles and pedestrians of a potential emergency situation through the use of visual and audio alerts. This will be referred to herein as the "emergency alert protocol," and the emergency vehicle will be referred to as "active" if it is engaging its emergency alert protocol. Visual alerts typically consist of flashing lights displayed by the emergency vehicle. The light scheme depends on the type of emergency vehicle (e.g., police car, ambulance, firetruck) and the nature of the alert. Audio alerts are typically emitted by the emergency vehicle's speaker system. In some emergency vehicles, the emergency vehicle may be configured to have a microphone option so the emergency responder can provide specific instructions to pedestrians that are physically located in the vicinity of the vehicle.

Vehicles have benefited from the advancement of improved sound isolation to reduce road noise. These advancements have resulted in audio alerts emitted from emergency vehicles becoming more difficult to hear. Privacy films—films which darken the windows of a passenger vehicle—have also become commonplace in vehicles. This has resulted in visual alerts from emergency vehicles becoming more difficult to see. Accordingly, there is a need for an alert system that provides an alert to drivers that will capture their attention without being disruptive and/or intrusive and that provides a benefit to public safety.

Referring generally to the figures, disclosed herein is a mobile alert transmission system that automatically transmits a radio-frequency signal to local vehicles and pedestrians to alert them of the presence of an active emergency vehicle. In some embodiments, a vehicle receives an alert signal through an in-car entertainment system (e.g., infotainment system). The in-car entertainment system registers the signal as a notification that an active emergency vehicle is nearby. In some embodiments, the in-car entertainment system is configured to pause any audio currently playing and instead output a pre-recorded audio message. In some embodiments, the car entertainment system is configured to output a live audio message emitted from the emergency vehicle. In some embodiments, the driver's seat and/or steering wheel also vibrates to provide the driver a haptic alert. The in-car entertainment system is also configured to display a textual message, in some embodiments. The textual, haptic, and audio messages alert the driver of an active and nearby emergency vehicle.

In exemplary embodiments, pedestrians within proximity of the emergency vehicle are also alerted of an active emergency vehicle. In some embodiments, pedestrians receive an alert signal through their cellular phones. The cellular phone is be configured to register the signal as a notification that an emergency vehicle is nearby and active. In some embodiments, the cellular phone is configured to pause any audio and video currently playing and instead output an audio and/or haptic alert. In some embodiments, the cellular phone also displays a textual message on a screen of the cellular phone. In some embodiments, the cellular phone is configured to vibrate to provide nearby pedestrians a haptic alert. The textual, haptic, and audio alerts notify the cellular phone user of a nearby active emergency vehicle.

Figure 1:
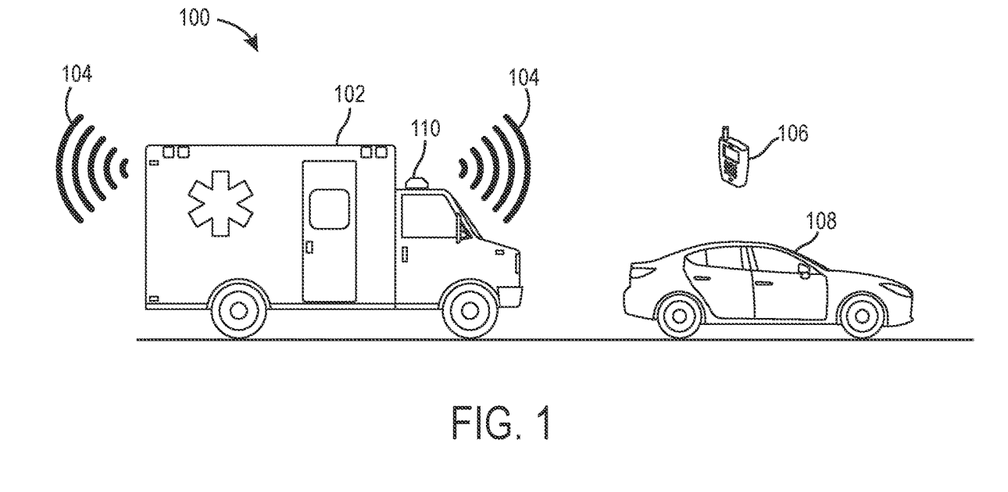
FIG. 1 is a perspective view of a mobile alert transmission system according to an exemplary embodiment.

Referring to FIG. 1, a mobile alerting transmission system 100 is shown according to an exemplary embodiment. In the illustrated embodiment, a mobile alerting transmitter 110 is disposed on an emergency vehicle 102. When the emergency vehicle 102 activates an emergency alerting protocol, the mobile alerting transmitter 110 produces a radio-frequency wave 104. The radio-frequency wave 104 is then received by a second vehicle 108 or by a cellular phone 106. In an exemplary embodiment, the mobile alerting transmitter 110 emits an omnidirectional radio-frequency wave 104 to a configured distance (e.g., 2 miles). This configuration allows the mobile alerting transmitter 110 to alert cellular phones and vehicles within a proximate distance of the mobile alerting transmitter 110, in all directions.

In another exemplary embodiment, the mobile alerting transmitter 110 emits the radio-frequency wave 104 in a specified direction(s) relative to the emergency vehicle 102. In some embodiments, the radio-frequency wave 104 is emitted to the front and rear of the emergency vehicle 102. In various embodiments, a user of the emergency vehicle 102 can control the direction of the radio-frequency wave 104 by adjusting the direction of the mobile alerting transmitter 110. The user may adjust the mobile alerting transmitter 110 by mechanically adjusting the direction of the mobile alerting transmitter 110 or through electronic controls. This configuration is advantageous as it allows the mobile alerting transmitter 110 to alert pedestrians and drivers of other vehicles that are in the path of or traveling along the same roadways as the emergency vehicle 102.

Figure 2:
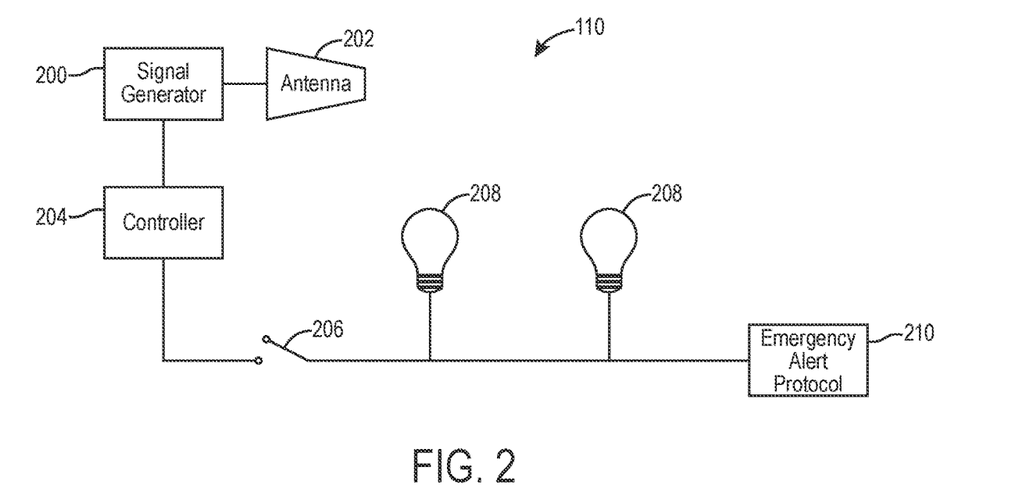
FIG. 2 is a schematic view of the mobile alert transmission system of FIG. 1.

Referring to FIG. 2, the mobile alerting transmitter 110 is shown according to an exemplary embodiment. The mobile alerting transmitter 110 includes a signal generator 200, an antenna 202, a controller 204, and an electronic switch 206. The mobile alerting transmitter 110 is operatively coupled to an emergency alerting protocol 210 of the emergency vehicle 102. The emergency alerting protocol 210 consists of the conventional alerts utilized by the emergency vehicle 102 according to local laws and customs. These alerts include light indicators 208 and sounds to alert pedestrians and other vehicles of a nearby active emergency vehicle 102. According to an exemplary embodiment, when a user of the emergency vehicle 102 activates the emergency alerting protocol 210, the electronic switch 206 is also activated. In some embodiments, the electronic switch 206 then activates the controller 204. When the emergency alerting protocol 210 is deactivated, the electronic switch 206 then automatically deactivates the controller 204. When the controller 204 is activated, it communicates instructions to the signal generator 200.

According to an exemplary embodiment, the signal generator 200 generates a radio-frequency configured to emit an electro-magnetic wave. The electro-magnetic wave is transmitted to the antenna 202. The antenna 202 converts the electro-magnetic wave to an electric signal within a radio-frequency range (e.g., the radio frequency waves 104). The radio-frequency wave 104 is configured to broadcast the electric signal within a proximate distance of the emergency vehicle 102.

In an exemplary embodiment, the antenna 202 is an omnidirectional antenna and is located on the top side of the emergency vehicle 102. In various embodiments, the antenna 202 is a directional antenna located at the front and/or rear side of the emergency vehicle 102.

In an exemplary embodiment, the emergency vehicle 102 users manually activate or deactivate the electronic switch 206. This configuration allows users of the emergency vehicle 102 to implement the mobile alerting transmitter 110 either in conjunction with or independent of the emergency alerting protocol 210.

In an exemplary embodiment, the electronic switch 206 is physically integrated and electronically coupled to the emergency alerting protocol 210. In another exemplary embodiment, the electronic switch 206 is integrated with the On-Board Diagnostics of the emergency vehicle 102. In yet another exemplary embodiment, the electronic switch 206 is located within the mobile alerting transmitter 110.

Figure 3:
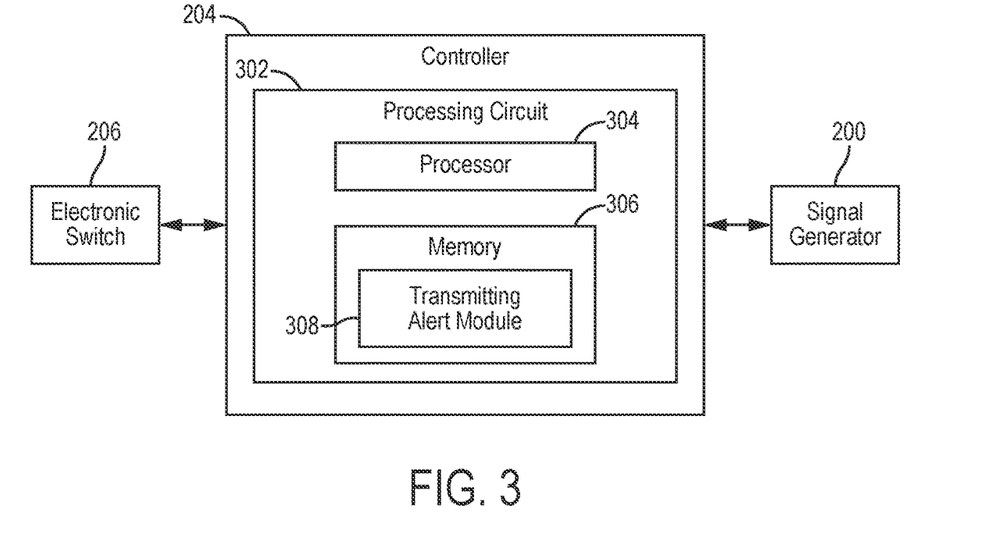
FIG. 3 is a schematic view of a transmitting portion of the mobile alert system of FIG. 1.

In the example embodiment illustrated in FIG. 3, the controller 204 is located on the emergency vehicle 102 and is configured to communicate with the signal generator 200. The controller 204 includes a processing circuit 302, a processor 306, and memory 304. Within the memory 304 is a transmitting alert module 308.

In an exemplary embodiment, the transmitting alert module 308 includes instructions to be provided to the signal generator 200 when activated. The instructions include the frequency range the radio-frequency wave 104 should be transmitted. The transmitting alert module 308 also provide instructions regarding the duration of the transmitting alert and/or the frequency intervals of transmitting the alert. In another exemplary embodiment, the signal generator 200 has a pre-determined radio frequency range for the radio-frequency wave 104 in which the transmitting alert module 308 activates the signal generator 200. According to some embodiments, the transmitting alert module 308 provides various instructions to the signal generator 200.

In the example shown in FIG. 3, the controller 204 includes the processing circuit 302 having the processor 306 and the memory 304. The processing circuit 302 may be structured or configured to execute or implement the instructions, commands, and/or control processes described herein with respect to transmitting alert module 308. The depicted configuration represents the transmitting alert module 308 as machine or computer-readable media. However, as mentioned above, this illustration is not meant to be limiting as the present disclosure contemplates other embodiments where the transmitting alert module 308, or at least one circuit of the transmitting alert module 308, is configured as a hardware unit. All such combinations and variations are intended to fall within the scope of the present disclosure.

The memory 304 (e.g., memory, memory unit, storage device) may include one or more devices (e.g., RAM, ROM, flash memory, hard disk storage) for storing data and/or computer code for completing or facilitating the various processes, layers and modules described in the present disclosure. The memory 304 may be communicably connected to the processor 306 to provide computer code or instructions to the processor 306 for executing at least some of the processes described herein. Moreover, the memory 304 may be or include tangible, non-transient volatile memory or non-volatile memory. Accordingly, the memory 304 may include database components, object code components, script components, or any other type of information structure for supporting the various activities and information structures described herein.

Figure 4:
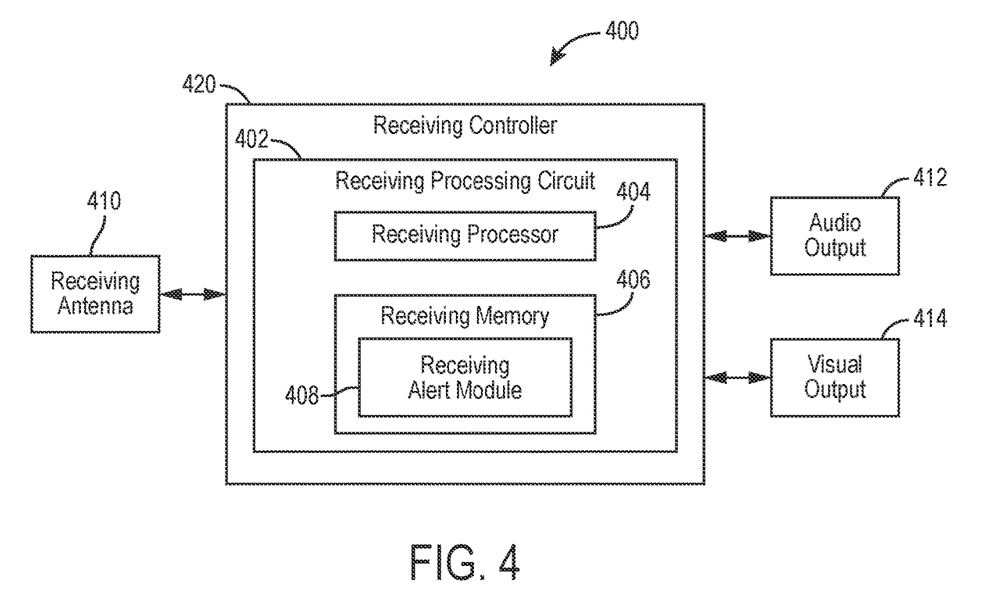
FIG. 4 is a schematic view of a receiving portion of a receiving system.

Referring to FIG. 4, a receiving system 400 is located on a receiving device according to an example embodiment. In some embodiments, the receiving device is a pedestrian's cellular phone 106 or a second vehicle 108 (e.g., a passenger vehicle, etc.). The receiving system 400 is responsible for receiving the radio-frequency wave 104 emitted by the transmitting antenna 202. The receiving system 400 then processes the signal and generates an output via the receiving device. In an exemplary embodiment, the receiving system 400 includes a receiving antenna 410, a receiving controller 420, an audio output 412, and a visual output 414. In an exemplary embodiment, the receiving controller 420 includes a receiving processing circuit 402. The receiving processing circuit 402 includes a receiving processor 404 and receiving memory 406. The receiving memory includes a receiving alert module 408. The receiving processing circuit 402 is configured to read the receiving alert module 408 to determine how to process the signal and which outputs to generate.

In an exemplary embodiment, the receiving antenna 410 receives a radio wave signal in the form of the radio-frequency wave 104. The signal is processed by the receiving processing circuit 402. If the frequency of the radio-frequency wave 104 is within a range specified by the receiving alert module 408, the receiving alert module 408 will execute a program within the receiving processing circuit 402 to perform an audio output 412 and a visual output 414.

In an exemplary embodiment, if the receiving device is a cellular phone 106, the cellular phone 106 will mute or decrease the volume of all other audio (e.g., phone calls, music, applications). The cellular phone 106 then plays a specified audio alert or a pre-recorded message. In some embodiments, the cellular phone displays a visual output 414 in the form of a textual message in addition to or in lieu of an audio alert. In another exemplary embodiment, the visual output 414 may be a graphic.

In an exemplary embodiment, if the receiving device is a second vehicle 108, the in-car entertainment system of the second vehicle 108 will mute or decrease the volume of all other audio (e.g., phone calls, radio, navigation system). The in-car entertainment system then plays a specific audio alarm or a pre-recorded alarm message. In some embodiments, the in-car entertainment system of the second vehicle 108 displays a visual output 414 in the form of a textual message in addition to or in lieu of an audio alert. In another exemplary embodiment, the visual output 414 may be a graphic.

In another exemplary embodiment, if the receiving device is a second vehicle 108, the receiving alert module 408 may communicate with autonomous capabilities of the second vehicle 108. This may include directing the rate of speed and direction of the second vehicle 108. After registering the radio-frequency wave 104, the autonomous capabilities of the second vehicle 108 may slow its rate of speed and move in a direction away from the active emergency vehicle 102. In another example, after registering the radio-frequency wave 104, the autonomous capabilities of the second vehicle 108 may slow its rate of speed and move in a direction away from the incoming emergency vehicle 102 and/or come to a complete stop. The autonomous capabilities of the second vehicle 108 may also include activate exterior cameras of the second vehicle 108 to show a video feed of the incoming emergency vehicle 102. This is advantageous as it notifies the driver of which direction the emergency vehicle 102 is incoming.

In an exemplary embodiment, the mobile alert transmission system 100 is communicatively coupled to cell towers in proximity of the mobile alert transmission system 100 via the antenna 202. This facilitates the transmitting alert module 308 to be updated automatically. This is especially advantageous for a fleet of emergency vehicles. In another exemplary embodiment, the cellular phone 106 and/or the second vehicle 108 are also communicatively coupled to cell towers in proximity of the cellular phone 106 and/or the second vehicle 108 via the receiving antenna 410. This facilitates the cellular phone 106 and/or the second vehicle 108 to be updated automatically.

Figure 5:
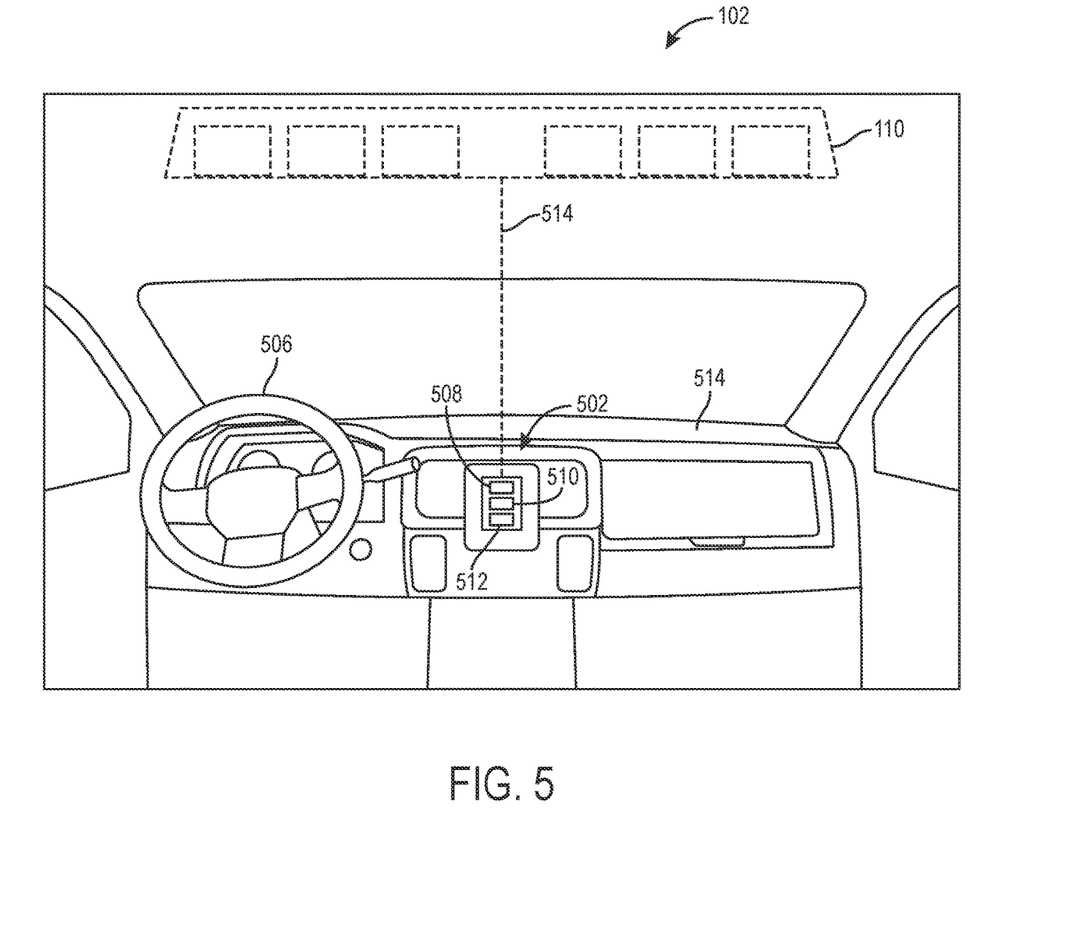
FIG. 5 is a view of a portion of an emergency vehicle according to another exemplary embodiment.

FIG. 5 is a view of a portion of emergency vehicle 102 according to another embodiment. The emergency vehicle 102 includes a three-way switch 502. The three-way switch 502 may be used in conjunction with or instead of the electronic switch 206. The three-way switch 502 enables a user of the emergency vehicle 102 to generate omnidirectional radio-frequency waves, directional radio-frequency waves, or to disengage the mobile alerting transmitter 110. In these embodiments, the antenna 202 is configured to generate omnidirectional or directional radio-frequency waves. The three-way switch 502 may be disposed on a dashboard, an interior panel, an exterior panel, or a steering wheel 506 of the emergency vehicle 102. In another embodiment, the emergency vehicle 102 includes a plurality of three-way switches 502 disposed at various positions within the emergency vehicle 102. This is advantageous as it allows the user convenient access to the mobile alerting transmitter 110 at various places in the emergency vehicle 102.

The three-way switch 502 includes a first button 508 (e.g., knob, actuator). When activated, the first button 508 activates the antenna 202 to generate omnidirectional frequency waves. The three-way switch 502 also includes a second button 510 (e.g., knob, actuator). When activated, the second button 510 activates the antenna 202 to generate directional frequency waves. The three-way switch 502 also includes a third button 512 (e.g., knob, actuator). When activated, the third button 512 disengages the antenna 202, stopping all radio-frequency waves. In some embodiments, the three-way switch 502 uses a slider function (e.g., the user slides a knob to a certain position to achieve their desired setting).

The three-way switch 502 is communicatively coupled to the mobile alerting transmitter 110. In an example embodiment, the three-way switch 502 is electrically coupled to the mobile alerting transmitter 110. In another example embodiment, the three-way switch 502 is in wireless communication (e.g. Bluetooth, Near-field communication) with the mobile alerting transmitter 110. After the user selects their desired setting using one of the buttons 508, 510, 512, the three-way switch 502 sends a switch signal 514 (e.g., via a conduit, Bluetooth, Near-field communication) to the mobile alerting transmitter 110. The mobile alerting transmitter 110 then activates the antenna 202 to replicate the desired setting of the three-way switch 502.

Figure 6:
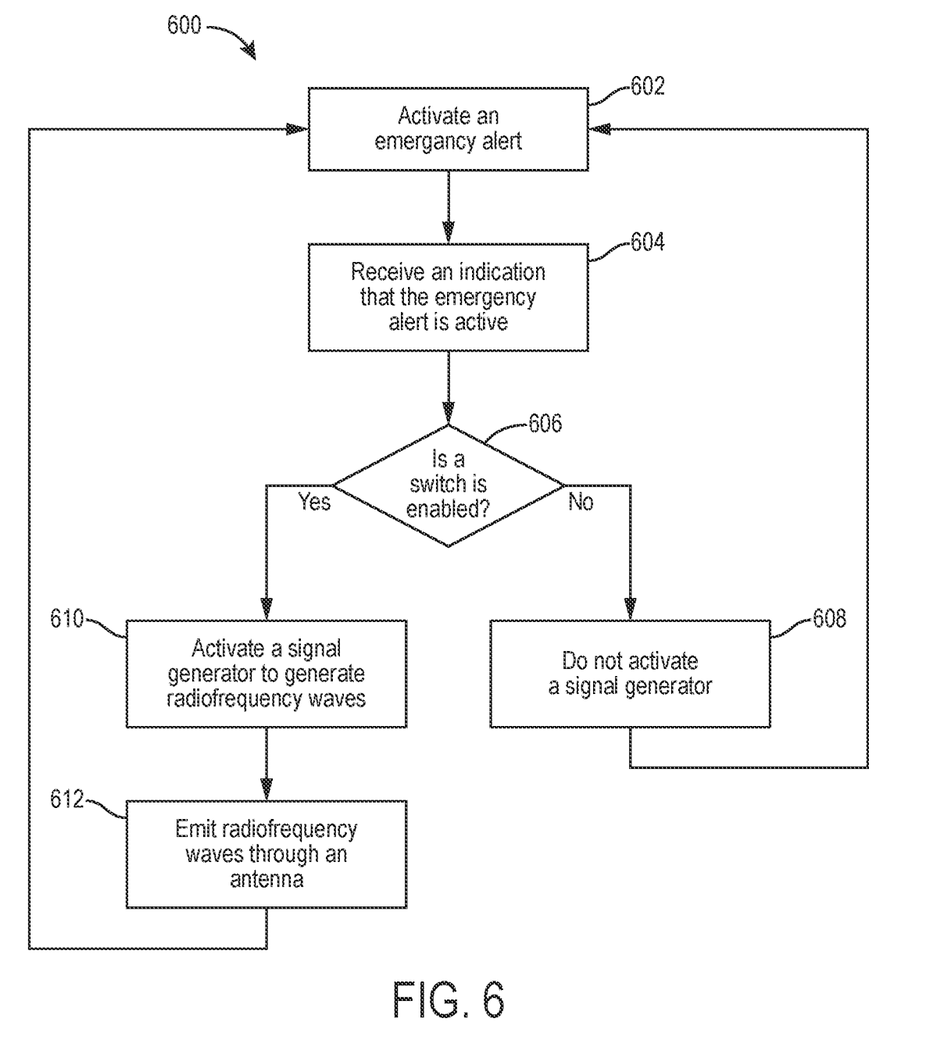
FIG. 6 is a flowchart for a mobile alert transmission method.

Referring to FIG. 6, a mobile alert transmission method 600 is shown. The mobile alert transmission method 600 is utilized for an emergency vehicle, such as emergency vehicle 102. The mobile alert transmission method 600 utilizes a mobile alert transmission system, such as the mobile alerting transmitter 110. The mobile alert transmission method 600 includes activating an emergency alert, at step 602. In an example embodiment, the emergency alert is activated by a user of the emergency vehicle. The emergency alert includes conventional alerts utilized by an emergency vehicle including visual and audio alerts. After the emergency alert The mobile alert transmission method 600 may also include receiving an indication by a controller, that the emergency alert is active, at step 604. The controller may be similar to the controller 204.

The mobile alert transmission method 600 may also include determining if a switch is enabled, at step 606. The switch may be similar to the electronic switch 206 and/or the three-way switch 502.

When the switch is not enabled, the mobile alert transmission method 600 may also include the controller not activating a signal generator, at step 608. In some embodiments, the mobile alert transmission method 600 may also include the controller deactivating the signal generator, at step 608. The mobile alert transmission method 600 may include returning to step 602 to determine if the emergency alert is still activated. The signal generator may be similar to the signal generator 200.

When the switch is enabled, the mobile alert transmission method 600 may also include the controller activating a signal generator, at step 610. This configuration is advantageous as it allows for the signal generator to automatically be activated when the emergency alert is activated.

When the signal generator is enabled, the mobile alert transmission method 600 may also include emitting radio-frequency waves through an antenna, at step 612. The radio-frequency waves may be similar to radio-frequency waves 104, and the antenna may be similar to antenna 202. In some embodiments, the mobile alert transmission method 600 further includes returning to step 602 to determine if the emergency alert is still activated.

The hardware and data processing components used to implement the various processes, operations, illustrative logics, logical blocks, modules, and circuits described in connection with the embodiments disclosed herein (e.g., the processor 306) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the transmitting alert module 308 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A mobile alert transmission system for an emergency vehicle comprising:
   a switch configured to activate an emergency alert;
   an adjustable directional antenna configured to emit radio-frequency waves, the radio-frequency waves configured to transmit the emergency alert;
   an antenna adjusting device configured to change the direction of the adjustable antenna;
   a signal generator electronically coupled to the antenna, the signal generator configured to generate the radio-frequency waves and to provide the radio-frequency waves to the antenna; and
   a controller communicable with the signal generator and the switch, the controller configured to:
      receive a command from the switch to activate the emergency alert; and
      cause the signal generator to generate the radio-frequency waves;
   wherein the antenna is further configured to transmit the radio-frequency waves to a receiving device, wherein the receiving device is in communication with autonomous capabilities of a second vehicle to control a speed of the second vehicle, activate a camera of the second vehicle, and provide via an in car entertainment system within the second vehicle a real-time audio message from the emergency vehicle.

2. The mobile alert transmission system of claim 1, wherein the antenna is configured to provide the emergency alert to a computing device associated with a bystander in a configurable proximity of the emergency vehicle.

3. The mobile alert transmission system of claim 1, wherein the antenna is configured to provide the emergency alert to a vehicle associated with a bystander in a configurable proximity of the emergency vehicle.

4. The mobile alert transmission system of claim 1, wherein the antenna emits omnidirectional radio-frequency waves.

5. The mobile alert transmission system of claim 1, wherein the antenna emits radio-frequency waves in a direction coincident to the direction the emergency vehicle is traveling along.

6. The mobile alert transmission system of claim 1, wherein the emergency alert further comprises an audio alert and a visual alert.

7. The mobile alert transmission system of claim 1, wherein the controller is further configured to:

cause the antenna to emit omnidirectional radio-frequency waves when the switch is at a first setting;
cause the antenna to emit radio-frequency waves in a direction coincident to the direction the emergency vehicle is traveling along when the switch is at a second setting; and
cause the antenna to deactivate when the switch is at a third setting.

8. A mobile alert transmission system for an emergency vehicle comprising:
a plurality of light indicators configured to produce a visual alert when an emergency alert is activated;
a controller electronically coupled to the plurality of light indicators and removably coupled to the plurality of light indicators;
a circuit switch configured to removably couple the plurality of light indicators to the controller when the circuit switch is activated;
an adjustable directional antenna configured to emit radio-frequency waves when the emergency alert is activated;
an antenna adjusting device configured to change the direction of the adjustable antenna; and
a signal generator electronically coupled to the antenna and electronically coupled to the controller, the signal generator configured to generate the radio-frequency waves and to provide the radio-frequency waves to the antenna;
wherein the controller is configured to:
activate the circuit switch when the emergency alert is activated;
cause the circuit switch to removable couple the plurality of light indicators to the controller; and
cause the signal generator to generate the radio-frequency waves;
wherein the antenna is further configured to transmit the radio-frequency waves to a receiving device, wherein the receiving device is in communication with autonomous capabilities of a second vehicle to control a speed of the second vehicle, activate a camera of the second vehicle, and decrease a volume of pre-existing audio of an in-car entertainment system within the second vehicle.

9. The mobile alert transmission system of claim 8, wherein the antenna is configured to provide the emergency alert to a computing device associated with a bystander in a configurable proximity of the emergency vehicle.

10. The mobile alert transmission system of claim 8, wherein the antenna is configured to provide the emergency alert to a vehicle associated with a bystander in a configurable proximity of the emergency vehicle.

11. The mobile alert transmission system of claim 8, wherein the antenna emits omnidirectional radio-frequency waves.

12. The mobile alert transmission system of claim 8, wherein the antenna emits radio-frequency waves in a direction coincident to the direction the emergency vehicle is traveling along.

13. The mobile alert transmission system of claim 8, wherein the emergency alert further comprises an audio alert.

14. The mobile alert transmission system of claim 8, wherein the controller is further configured to:
cause the antenna to emit omnidirectional radio-frequency waves when the circuit switch is at a first setting;
cause the antenna to emit radio-frequency waves in a direction coincident to the direction the emergency vehicle is traveling along when the circuit switch is at a second setting; and
cause the antenna to deactivate when the circuit switch is at a third setting.

15. A method of generating and transmitting a mobile alert from an emergency vehicle, the method comprising:
receiving, by a controller, an indication that an emergency alert has been activated;
determining, by the controller, if an electronic switch is activated, the electronic switch configured to activate a radio-frequency alert;
causing, by the controller, a signal generator to generate a signal, the signal generator operatively coupled to the electronic switch;
transmitting, by the controller, the signal to an adjustable directional antenna operatively coupled to the signal generator, the antenna coupled to an antenna adjusting device configured to change the direction of the antenna;
causing, by the controller, the antenna to emit radio-frequency waves; and
causing, by the controller, the antenna to transmit the radio-frequency waves to a receiving device, wherein the receiving device is in communication with autonomous capabilities of a second vehicle to control a speed of the second vehicle, activate a camera of the second vehicle, and control a steering wheel of the second vehicle to provide a haptic alert to a user of the second vehicle.

16. The method of claim 15, wherein the antenna is configured to provide the emergency alert to a computing device associated with a bystander in a configurable proximity of the emergency vehicle.

17. The method of claim 15, wherein the antenna is configured to provide the emergency alert to a vehicle associated with a bystander in a configurable proximity of the emergency vehicle.

18. The method of claim 15, wherein the antenna emits omnidirectional radio-frequency waves.

19. The method of claim 15, wherein the antenna emits radio-frequency waves in a direction coincident to the direction the emergency vehicle is traveling along.

20. The method of claim 15, wherein the controller is further configured to:
cause the antenna to emit omnidirectional radio-frequency waves when the electronic switch is at a first setting;
cause the antenna to emit radio-frequency waves in a direction coincident to the direction the emergency vehicle is traveling along when the electronic switch is at a second setting; and
cause the antenna to deactivate when the electronic switch is at a third setting.

* * * * *